J. POWELL.
Globe-Valve.
No. 6,529.
Reissued July 6, 1875.
FIG. 1.
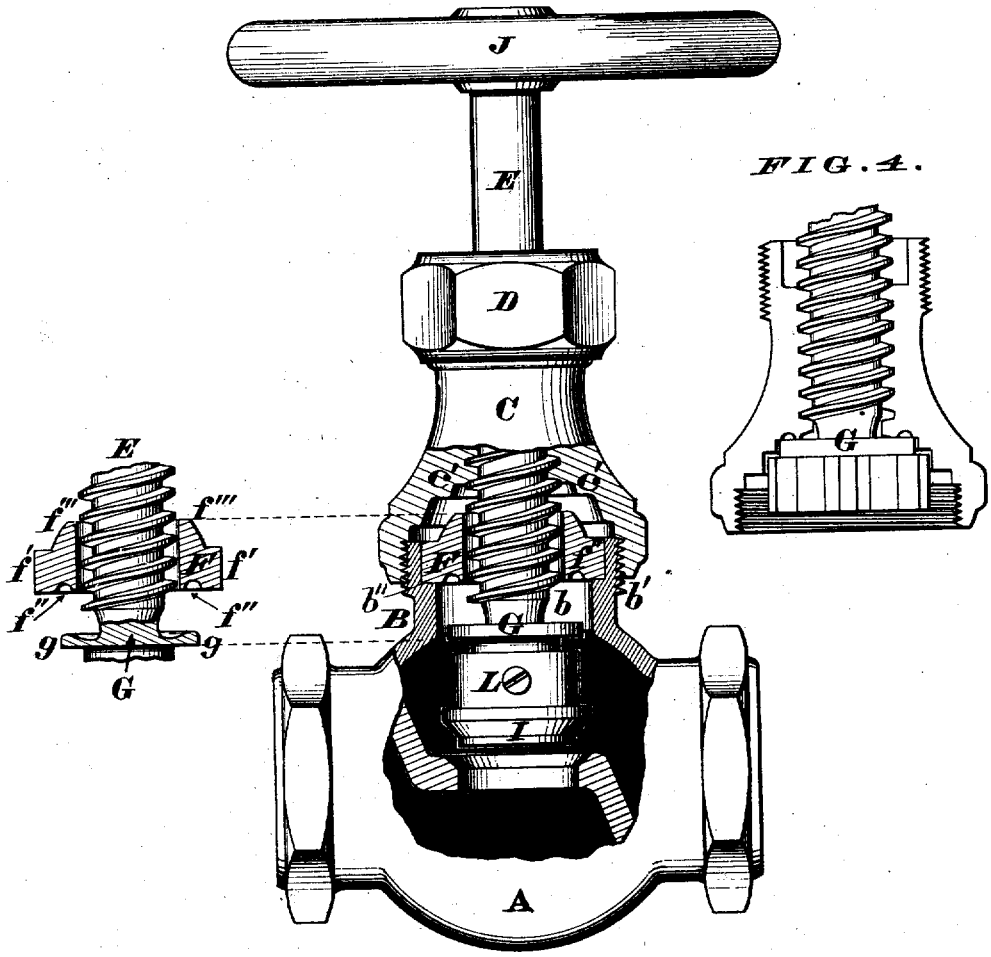
FIG. 4.
FIG. 3.
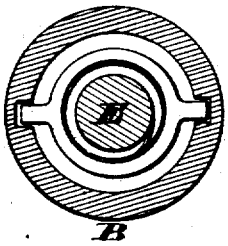
FIG. 2.
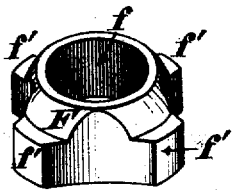
Attest.
Jas. H. Layman
Walter Knight
James Powell
By Knight Bros. Att'ys.
N. PETERS, PHOTO-LITHOGRAPHER, WASHINGTON, D. C.

UNITED STATES PATENT OFFICE.

JAMES POWELL, OF CINCINNATI, OHIO.

IMPROVEMENT IN GLOBE-VALVES.

Specification forming part of Letters Patent No. 77,913, dated May 12, 1868; reissue No 6,529, dated July 6, 1875; application filed May 31, 1875.

*To all whom it may concern:*

Be it known that I, JAMES POWELL, of Cincinnati, Hamilton county, Ohio, have invented a new and useful Improvement in Globe-Valves, of which the following is a full, clear, and exact description, reference being had to the accompanying drawing making part of this specification.

My invention is an improvement on those cocks commonly called globe-valves, in which provision is made for regrinding of the disk or valve proper to its seat by the instrumentality of its proper stem and handle; and my invention consists chiefly in an arrangement of a loose guide-collar and its accessories, for the convenient and accurate grinding and regrinding of the valve. My invention further consists in an arrangement of secondary or auxiliary seats on the guide-piece and cap, which enables the repacking of the stuffing-box at any time, even while a full pressure of steam remains in the cock.

In the accompanying drawing, Figure 1 is a partially sectionized side elevation of a globe-valve embodying my invention. Fig. 2 is a perspective view of the loose guide-collar. Figs. 3 and 4 show modifications.

In the original and improved forms of globe-valves, patented to me on the 2d of May, 1865, and on the 5th of February, 1867, respectively, the valve-stem is provided with fixed wings or guides, for retaining said stem in an axial position, with respect to the seat, while being reground.

In my present improvement, in its preferred form, the guiding-wings consist of projections from a loose or movable collar, placed over and around the threaded or smooth part of the valve-stem, thus enabling cocks embracing my principle to be more cheaply and expeditiously manufactured.

Globe-valves having loose disks, as heretofore constructed, have had no provision for packing the stem under full pressure of steam, and hence, before such valves could be repacked, the steam had invariably to be shut off, involving great inconvenience and delay, whereas globe-valves made on my present improved plan may be readily repacked at any moment, whether the valve be in its closed or in its extreme open position.

The body A of the improved globe valve or cock has a neck, B, having a smooth cylindrical interior, *b*, of larger diameter than the contiguous interior of the globe-chamber, so as to present a ledge or shoulder, *b''*, for support in its lowest position of the guide-collar, hereinafter described; and said neck has a screw-threaded exterior, *b'*, which exterior receives the interiorly screw-threaded hub, cap, or chamber C, said hub being surmounted by a customary stuffing-box, D, as described in my patent of May 2, 1865. The valve-stem E is threaded in the ordinary manner as far down as the fixed collar G.

In addition to the above I provide a loose guide-piece or collar, F, whose cylindrical orifice *f* is adapted to slide or revolve freely over the threaded portion of the valve-stem E, while, at the same time, the periphery of the wings *f'*, which radiate from said collar, is adapted to fit and slide snugly within the cylindrical interior *b*, of the neck B, which interior may, if preferred, be extended downwardly to increase the guiding-surface, as in my patent of February 5, 1867.

In my preferred form of the above the fixed collar G is surmounted by a raised rim or seat, *g*, which, in the elevated condition of the valve, fits and occupies an annular depression or gutter, *f''*, on the under side of the loose collar F, and the said loose collar is itself surmounted with a raised rim or seat, *f'''*, which, when the valve is elevated, occupies an annular gutter, *c'*, in the under side of the hub or cap C. The valve proper I has a short projection, *i*, from its under side, which fits snugly within the straight or cylindrical portion M of the valve-seat opening, while the valve is seated or being ground, as in my patent of February 5, 1867. The said valve I is chambered out on top to receive the lower swell of the screw-stem, and is provided with a set-screw, L, which, when the valve is in its normal condition, works in a circumferential groove near the lower end of the stem E, so as to retain the valve in place without effecting its capacity for independent oscillation and rotation. A countersink is provided to receive the end of the screw L when the valve is locked for the purpose of grinding. When it is desired to grind the valve to its seat the cap C is temporarily unscrewed, and, the valve and stem being withdrawn, the set-screw L is turned down into the cavity provided, as in my patent of February 5, 1867, so as, without impairing the free oscillation of the valve, to oblige it to revolve in company with the stem in the operation of grinding. A suitable abradant being applied, the loose collar is adjusted to its place in the neck B, and thus becomes a guide, through which the stem revolves, and by which it is retained in a truly axial position while the valve is being ground. The grinding having been effected the screw L is to be loosened sufficiently to allow the valve to revolve upon the stem. Should it be desired to repack the stem while the valve is in use or while a full head of steam is flowing through the cock, the operator has merely to screw the stem back to its fullest extent, until the fixed collar is forced up against the loose collar, and the latter against the cap, so as to secure a perfectly tight joint, which having been done the gland D may be removed to receive the packing in the usual way.

I do not propose to confine myself to the precise arrangement here described, as various modifications of my improvement may be made; for example, the loose collar may, instead of the winged piece F, consist of a circular ring, or may be a simple cross-bar, dropped into vertical grooves in the neck of the globe, as in Fig. 3, or the fixed collar G may bear at once in the depression of the cap in the elevated position of the stem. (See Fig. 4.)

The groove $c'$ in the hub C may be dispensed with, if desired, as a tight joint can be insured by simply forcing the collar G tightly against the flat under surface of the loose collar F and hub C.

I claim herein as new and of my invention—

1. The loose collar or guiding rim F, fitting and being supported by the counterbored interior $b$ $b''$ of the globe-valve neck, substantially in the manner described.

2. The packing-collar G in combination with the loose disk-valve and the hub C, as described and set forth.

3. The described loose disk-valve I, lock-pin L, stem E, fast collar G, and loose collar F, combined and arranged as set forth.

4. The valve I, loose guide-collar F, counterbored neck $b'$ $b''$, screw-stem E, and handle J, combined and arranged substantially as described.

In testimony of which invention I hereunto set my hand.

JAMES POWELL.

Attest—
GEO. H. KNIGHT,
WALTER KNIGHT.